United States Patent [19]

Childers et al.

[11] Patent Number: 5,331,627
[45] Date of Patent: Jul. 19, 1994

[54] CARTRIDGE ADAPTOR

[75] Inventors: Edwin R. Childers; Dale H. Anderson, both of Tucson, Ariz.; Syed T. Shafaat, Langley, Wash.

[73] Assignee: International Business Machines Corporation, Armonk, N.Y.

[21] Appl. No.: 981,072

[22] Filed: Nov. 24, 1992

[51] Int. Cl.⁵ .................................................. G11B 23/03
[52] U.S. Cl. .................................. 369/291; 369/289; 369/292; 360/133
[58] Field of Search ............... 369/289, 290, 291, 292; 360/133, 137

[56] References Cited

U.S. PATENT DOCUMENTS

| | | | |
|---|---|---|---|
| 4,837,784 | 6/1989 | Yamamori | 369/289 |
| 4,928,271 | 5/1990 | Verhagen | 369/292 |
| 5,204,853 | 4/1993 | Kamoshita | 369/289 |
| 5,208,802 | 5/1993 | Suzuki et al. | 369/289 |

FOREIGN PATENT DOCUMENTS

| | | |
|---|---|---|
| 288900 | 11/1988 | European Pat. Off. . |
| 331389 | 9/1989 | European Pat. Off. . |
| 391638 | 10/1990 | European Pat. Off. . |
| 6484468 | 3/1989 | Japan . |
| 2121174 | 5/1990 | Japan . |
| 2187973 | 7/1990 | Japan . |
| 2263353 | 10/1990 | Japan . |

Primary Examiner—Stuart S. Levy
Assistant Examiner—Paul J. Ditmyer
Attorney, Agent, or Firm—Greenlee and Winner

[57] ABSTRACT

An adaptor cartridge for holding a 90 mm optical disk cartridge for insertion into a 130 mm disk drive apparatus. The cartridge adaptor emulates the external dimensions and features of a 130 mm cartridge so that it can be loaded into and manipulated by the 130 mm drive in the same manner as a normal 130 mm cartridge. The cartridge adaptor contains a shutter arm for opening the 90 mm cartridge door upon insertion of the cartridge into the adaptor cartridge in much the same manner as a 90 mm cartridge door is opened when the cartridge is inserted into a 90 mm drive. The cartridge adaptor also contains a pseudo 90 mm spindle located in an adaptor hub. The pseudo spindle fits within the centering hole of the 90 mm media disk. The adaptor cartridge carries an annular magnet for attracting and holding the 90 mm media disk on the adaptor hub. The underside of the adaptor hub is a simulated 130 mm cartridge hub for mating with the 130 mm drive spindle. The adaptor cartridge may also include a rotating permanent magnet directly above the 90 mm cartridge shutter opening for providing a bias magnetic field to enable writing a magneto-optic disk. Proper orientation of the rotating magnet is provided by the 130 mm drive bias coil.

19 Claims, 5 Drawing Sheets

CARTRIDGE ADAPTOR

This invention relates to recording/playback apparatus for use with standardized cartridges and more particularly to an adaptor for holding a cartridge of small diameter for insertion into apparatus designed for larger diameter cartridges.

BACKGROUND OF THE INVENTION

Optical disk devices are used for the storage of computer-prepared data and have recognized value in their ability to store large quantities of data. The media for use in such devices is reactive to the intensity modulation of light, such as may be produced by the rapid switching of a semi-conductor laser. In order to write data on optical media, the laser power must be controlled at a relatively high power level, in order that the media can be altered in accordance with the input data stream. In reading the data back, the laser power level is controlled to a lower level so that the media is not altered by the laser beam but the reflected light indicates the presence or absence of media alterations, that is, digits of data caused by the input data stream.

Optical media is of two general types, media which can be written only once and media which can be written, erased, and written again. Write-once media (WORM) is permanently altered when write power levels are produced by the laser beam. Erasable media, such as magneto-optic (MO) media, is not permanently altered when data is written. In the MO media, the magnetic orientation of the reactive material is altered in the writing process, and in the erasing process, the magnetic orientation is reordered.

When reading MO data from an optical disk, the reflected light beam is passed through optical elements such as a quarter wave-plate and a polarizing beam splitter to separate the reflected beam into P and S polarization components. The balance in the amplitude of the P and S beam components is affected by the magnetic orientation of the MO media, which rotates the linear polarization of the reflected light beam in accordance with the well-known Kerr effect. By sensing the light amplitudes of the P and S beam components, the magnetic orientation of the media is sensed thereby enabling the generation of an MO data signal in accordance with the magnetic orientation present in the media. For example, the light amplitude of the two beams may produce a first value for a first magnetic domain orientation representing a "zero" bit, and a second value for a reverse magnetic domain orientation representing a "one" bit. There are other types of encoding schemes; some use transitions from one state to another as a "bit."

Before MO media can be written, it should be erased, that is, all magnetic domains should have the same orientation. That is accomplished within playback/recording apparatus by placing a bias coil in close juxtaposition with the media. Thereafter, the entire optical disk is heated by the laser to a level sufficient to enable a bias field generated by the bias coil to orient the magnetic domains within the optical media in the same direction. That direction is then considered to represent a "zero" bit.

In order to write "one" bits on the optical media, the bias coil is again placed into close juxtaposition with the media. At each spot on the optical disk at which it is desired to write a "one" bit, the laser is energized to heat that spot to an elevated level sufficient to enable a bias field generated by the bias coil to reverse the magnetic orientation of that spot on the media. The reverse orientation is a result of applying current to the bias coil in a reverse direction from that used in erasing the disk such that the magnetic field produced by the bias coil is reversed. In that manner, the orientation of the magnetic domains at the spot heated by the laser is reversed.

For write-once media, data is read back by reflecting a light beam from the surface of the disk. The reflected light beam is intensity-modulated by the permanent condition of the disk and by detecting the intensity of the reflected light beam, a signal is generated in accordance with the WORM data.

There are various types of WORM media. One type requires the burning away of a reflective surface by a laser beam at those spots at which "one" digits are to be written. As a consequence, when reading such media, light is reflected with significant intensity from those areas which have not been altered by the laser and with much less intensity from those spots at which the reflective surface is removed. When the intensity of the reflected light is detected at a low level, the detecting apparatus interprets a "one" bit. When the intensity is high, the detecting apparatus interprets a "zero" bit.

The American National Standards Institute (ANSI) has developed cartridges with standard dimensions for holding recording media. In that manner the manufacturers of cartridges and the manufacturers of recording/playback apparatus (drives) have the capability of developing their respective products for use with a variety of other manufacturers products. The standard cartridge includes datum features, for example, locating holes, that are designed to mate with datum features in a drive, for example locating pins, to accurately position the cartridge within the drive. Holding features in the cartridge such as notches and recesses, are dimensioned relative to the datum features. After insertion of a cartridge into a drive, the notches are typically used to hold the cartridge while it is loaded onto the locating pins and simultaneously loaded onto the drive spindle.

Standards have been developed for 130 mm (5.25 inch) optical disk drives and cartridges, and other standards have been developed for 90 mm (3.5 inch) optical disk drives and cartridges. These standards, unfortunately, have not been developed to allow upward compatibility so that the smaller diameter cartridge can be easily used within a drive designed for a larger diameter cartridge.

The 90 mm cartridge is much smaller than the 130 mm cartridge. This difference prevents a loader mechanism designed for a 130 mm cartridge from accepting a 90 mm cartridge unless the mechanism is extensively modified, resulting in a much more complex and costly design. The aperture in the 90 mm cartridge, which provides access to the disk hub by the spindle motor, is smaller than the disk hub and spindle motor hub defined by 130 mm standards. As a result, a spindle hub designed to drive a 130 mm disk cannot fit into the aperture of the 90 mm cartridge to make contact with the disk hub.

It is, therefore, an object of this invention to provide an adaptor cartridge to resolve the compatibility problem without any impact on the loader mechanism or spindle motor of the 130 mm optical disk drive. Accomplishment of that task enables the insertion of a 90 mm disk into a position in which data on the disk can be read by the 130 mm drive apparatus. Also, in the case of WORM media, the 90 mm WORM disk could be written by the 130 mm apparatus.

Even though the ability of placing a 90 mm optical disk and cartridge into a 130 mm form factor optical drive is a desirable feature, it is still not possible to write data on an MO disk unless a bias field can be applied to the disk. Since the large bias coil in a drive designed for 130 mm optical disk and cartridge cannot fit into the smaller opening of a 90 mm cartridge, provision must be made for providing the necessary bias field in some other manner.

It is therefore another object of this invention to provide a magnet in the adaptor cartridge so that the ability to write MO media is included in the adaptor cartridge.

SUMMARY OF THE INVENTION

Briefly stated, this invention resolves the compatibility problem of placing a 90 mm cartridge into a 130 mm drive without any impact to the loader mechanism or spindle motor of the 130 mm optical disk drive. A cartridge adaptor is provided with external dimensions which satisfy the 130 mm cartridge standards and into which a 90 mm cartridge can be inserted. The adaptor cartridge provides means for opening the 90 mm cartridge shutter and means for presenting the 130 mm spindle motor to the 90 mm disk. To open the shutter door, a shutter arm is provided within the adaptor cartridge so that the shutter door is opened when the cartridge is inserted into the cartridge adaptor. The shutter arm may open the door in the same manner that a shutter arm within a 90 mm disk drive would open the shutter door.

To present the 130 mm spindle motor to the 90 mm disk, a pseudo 90 mm spindle (spindle adaptor) is included within an adaptor hub located within the adaptor cartridge. The spindle adaptor fits within the centering hole of the 90 mm media to properly position the 90 mm media on the adaptor hub. The adaptor hub carries within it an annular magnet which holds the 90 mm media in place. When the cartridge adaptor is inserted into the 130 mm disk drive, an annular magnet within the spindle hub of the 130 mm disk drive attracts and holds the adaptor hub of the cartridge adaptor. The top of the 130 mm spindle fits into the underside of the spindle adaptor, thus properly centering the adaptor hub on the motor spindle. In that manner, the 90 mm disk is properly positioned, and held for rotation with the 130 mm spindle.

The cartridge adaptor also includes a small rotating permanent magnet arranged in close juxtaposition with the 90 mm media. The magnetic field generated by the 130 mm drive bias coil is used to align the direction of the rotating magnet so that a bias field is provided in one direction for erasing the MO disk and in a second direction for writing to the MO disk.

BRIEF DESCRIPTION OF THE DRAWING

The invention is set forth in detail below with reference to the accompanying drawing, a brief description of which follows.

FIG. 9 comprised of FIGS. 9a, 9b and 9c, illustrates the principles used in supplying a bias field to the 90 mm cartridge.

DETAILED DESCRIPTION

When reference is made to the drawing, like numerals will indicate like parts and structural features in the various figures.

Figure 1:
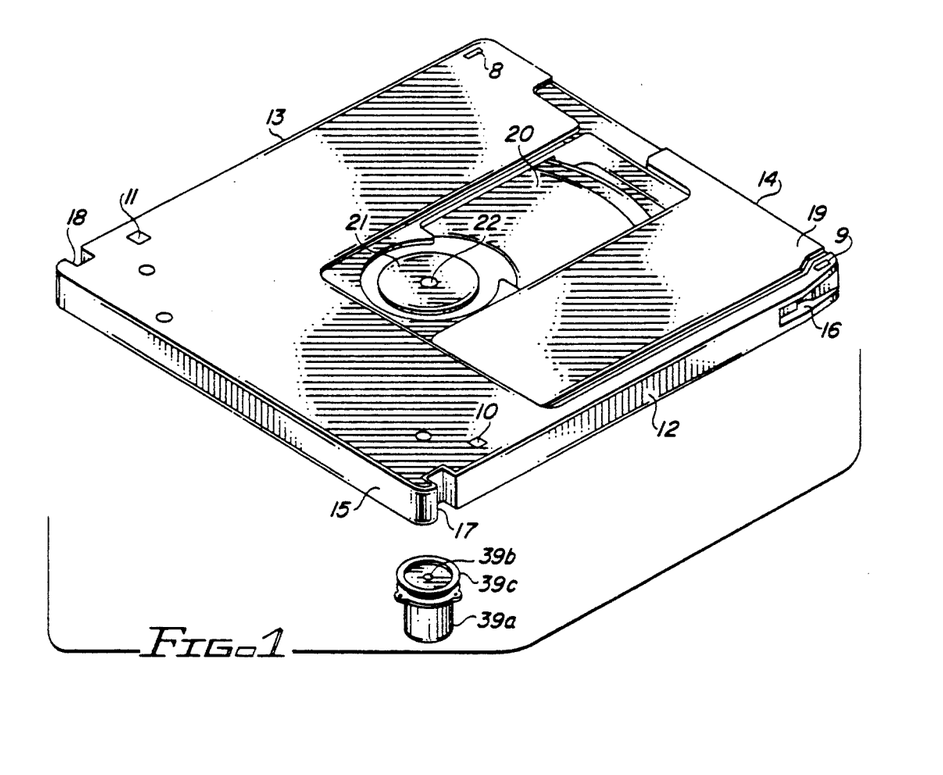
FIG. 1 shows a standardized 130 mm cartridge with a drive motor spindle and hub.

FIG. 1 is a perspective view of a standardized ANSI cartridge containing disk media. The cartridge contains locating datums, including datum areas or pads 8 and 9 and locating holes 10 and 11. Pads 8 and 9 are used for leveling the cartridge while holes 10 and 11 provide a rotational datum. The side edge faces 12 and 13, the front edge face 14, and the rear edge face 15 are held to a tight tolerance with respect to locating holes 10 and 11. The cartridge also contains gripper slots or notches 17 and 18, and a holding detent 16 in side edge face 12 with a similar holding detent 16a (not shown in FIG. 1) on the opposite side in edge surface 13. Many disk drive mechanisms utilize either the holding detent 16 or the gripper slots 17 and 18 to hold the cartridge within a holding tray while it is loaded onto the motor spindle and onto the locating pins. A preferred arrangement, however, is described in U.S. patent application Ser. No. 5,198,944 which is hereby incorporated by reference. FIG. 1 also shows a spindle motor 39a and the spindle 39b. The shutter door 19 is shown in the open position thereby exposing the media disk 20 inside the cartridge as well as showing the hub 21 upon which the media disk 20 is mounted. The drive spindle 39b is inserted through the center hole 22 of hub 21 when the cartridge is loaded and placed in driving position on the drive spindle 39b.

Figure 2:
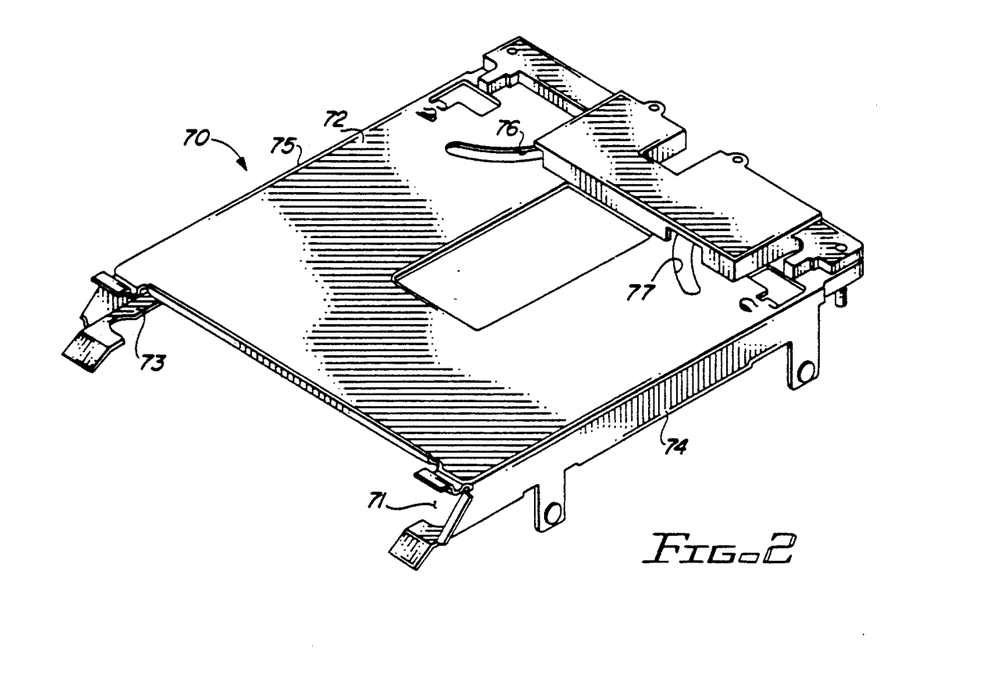
FIG. 2 shows a tray which may be included within an optical disk drive mechanism for receiving the cartridge of FIG. 1.

FIG. 2 shows a holding tray 70 for receiving a cartridge inserted into the recording/playback apparatus. Insertion of the cartridge into the tray 70 may be accomplished manually or by automated insertion apparatus such as might be present in a library device. The tray contains an opening 71 to receive the cartridge, a top surface 72, a bottom surface 73, and side surfaces 74 and 75. Slots 76 and 77 are provided in the top surface to accommodate shutter opening arms (not shown) which open the shutter door 19 of a cartridge containing disk media when the cartridge is inserted into the tray. Once the cartridge is inserted into the tray within the recording/playback apparatus, mechanisms within the apparatus will lower the tray and cartridge onto the spindle motor, or alternatively, raise the spindle motor so that the spindle engages the cartridge.

Figure 3:
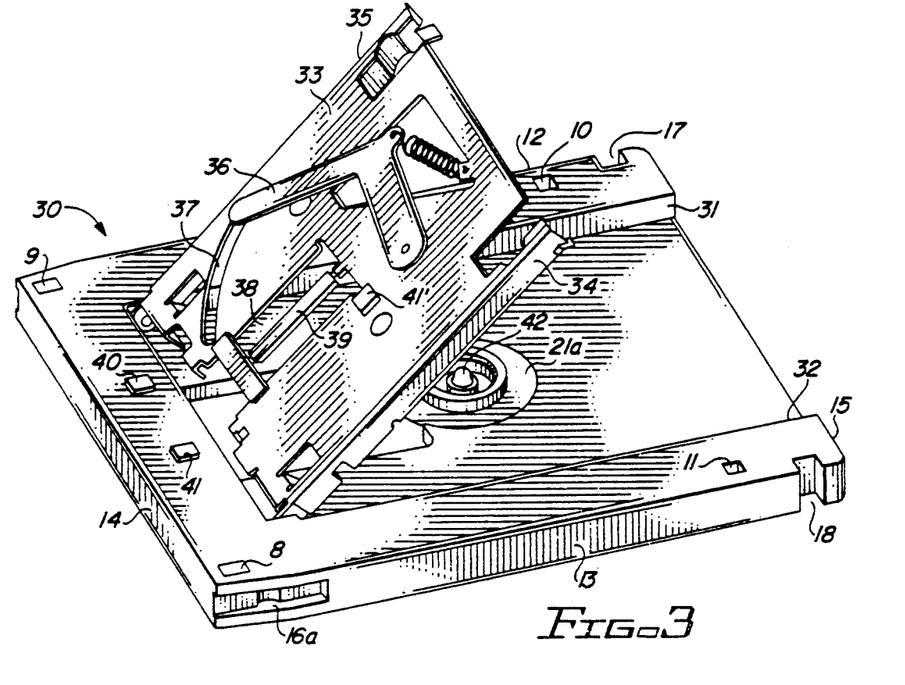
FIG. 3 shows a cartridge adaptor, according to this invention, simulating the cartridge of FIG. 1, and for receiving a 90 mm cartridge.

FIG. 3 shows a cartridge adaptor in accordance with the instant invention. The adaptor is designed to have the same external dimensions as the 130 mm cartridge shown in FIG. 1. As a consequence, the adaptor cartridge body 30 contains locating datums 8, 9, 10 and 11, side edge faces 12 and 13, a front edge face 14, and a rear edge face 15 held to the same tight tolerances with respect to the locating holes 10 and 11. The adaptor cartridge also contains gripper slots or notches 17 and 18, and holding detents 16 (not shown in FIG. 3) and 16a. Because the adaptor cartridge body 30 has the same external dimensions as the 130 mm cartridge, the adaptor cartridge can be inserted into the tray 70 of an optical drive mechanism to be held and located in the same manner as a 130 mm cartridge.

The adaptor cartridge body 30 contains a hollowed-out area, defined by side edge faces 31 and 32. Adaptor cartridge 30 also contains an adaptor tray 33 which pivots to a raised position as shown in FIG. 3. When adaptor tray 33 is lowered, the tray fills the hollowed-out area defined by the side edge faces 31 and 32. The adaptor cartridge tray 33 contains side edge faces 34 and 35 and is in many respects similar to the tray 70 shown in FIG. 2. Adaptor tray 33 however, is designed to receive a 90 mm cartridge, whereas the tray 70 receives a 130 mm cartridge.

FIG. 3 shows a shutter opening arm 36 which contains a projection (not shown) extending downwardly through the arcuate opening 37. When a 90 mm cartridge is inserted into the adaptor tray 33, the projection on the shutter opening arm 36 is moved along arcuate opening 37 to open the shutter of the cartridge exposing the 90 mm media.

The adaptor tray 33 contains an opening 38 in the top surface of the tray and an optional rotating permanent bias magnet 39 is shown mounted across the opening 38. The rotating magnet 39 is located so that it is in close juxtaposition to the 90 mm media when that media is inserted into the adaptor cartridge. Locating pads 40, 41 and 41' are placed near the front of the adaptor cartridge to serve as mounting locations for the bias coil assembly of the recording/playback apparatus when the bias coil assembly is lowered into position.

FIG. 3 shows an adaptor hub 21a which is retained within the adaptor cartridge 30. The adaptor hub 21a is designed to simulate the 130 mm cartridge hub 21 shown in FIG. 1 on its underside while providing a simulation of a 90 mm spindle hub on its top surface. That simulated 90 mm spindle hub is shown in FIG. 3 as including spindle adaptor 42. The spindle adaptor 42 is designed to receive the 130 mm spindle 39b on its underside and be driven by that spindle while providing a pseudo 90 mm spindle on the top surface for insertion into the center opening of 90 mm media. While shaft size and centering holes are the same diameter for both 90 mm and 130 mm devices, several differences exist such as hub diameter and chucking location. The adaptor hub provides for those differences.

Figure 4:
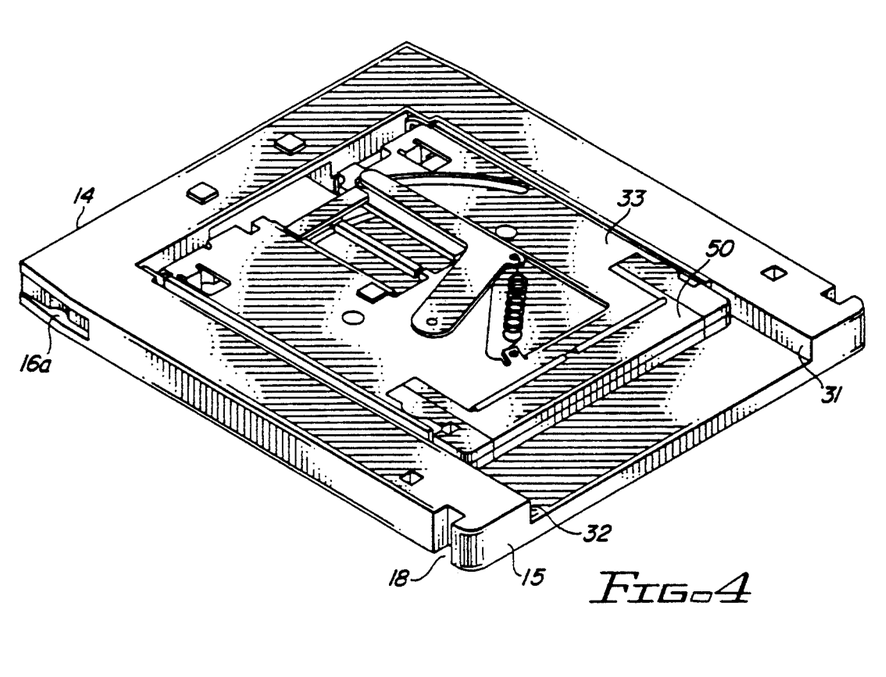
FIG. 4 shows the cartridge adaptor of FIG. 3 with a 90 mm cartridge inserted therein.

FIG. 4 is a view similar to FIG. 3 except that a 90 mm cartridge 50 is shown in the fully inserted position into adaptor tray 33. After receiving cartridge 50, adaptor tray 33 has been rotated into a closed position into the hollowed-out area defined by side-edge faces 31 and 32. Closing the tray 33 attaches the 90 mm media to the spindle adaptor 42.

Figure 5:
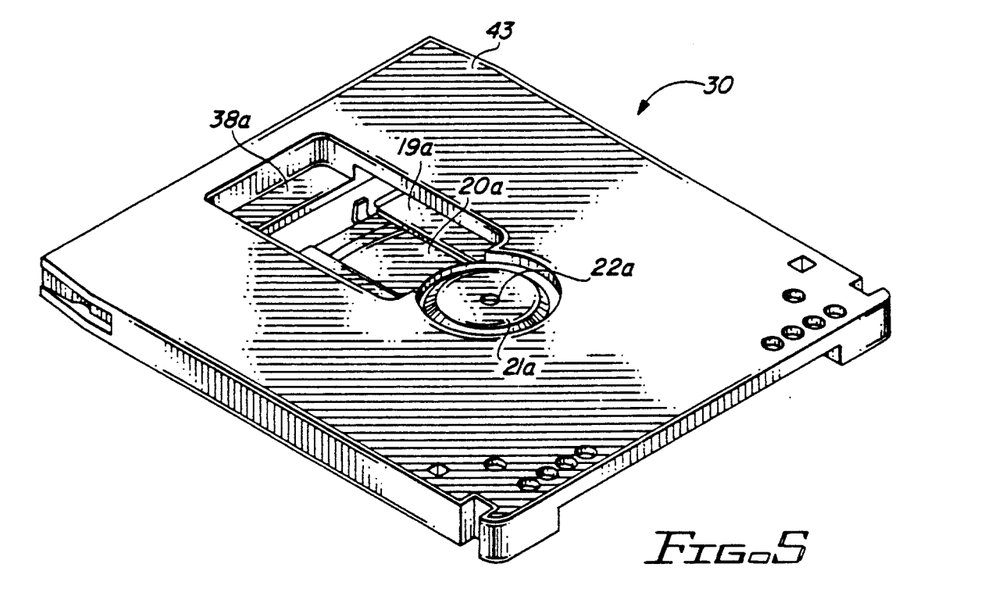
FIG. 5 is a bottom view of the loaded cartridge adaptor of FIG. 3.

FIG. 5 is a bottom view of cartridge adaptor 30 which has been loaded with a 90 mm cartridge. As previously mentioned, when the cartridge is loaded into the adaptor, the shutter arm 36 opens the cartridge so that the media inside the cartridge may be made available to the laser beam when the cartridge adaptor is inserted into the recording/playback apparatus. An opening 38a in the bottom surface 43 of adaptor cartridge 30 provides access to the 90 mm media 20a when the shutter is open. Part of the opened shutter door 19a can also be seen in FIG. 5. FIG. 5 also shows the bottom surface of adaptor hub 21a which provides a simulation of a 130 mm disk hub, as mentioned above. An aperture 22a is present in adaptor hub 21a in order to receive a drive spindle.

Figure 6:
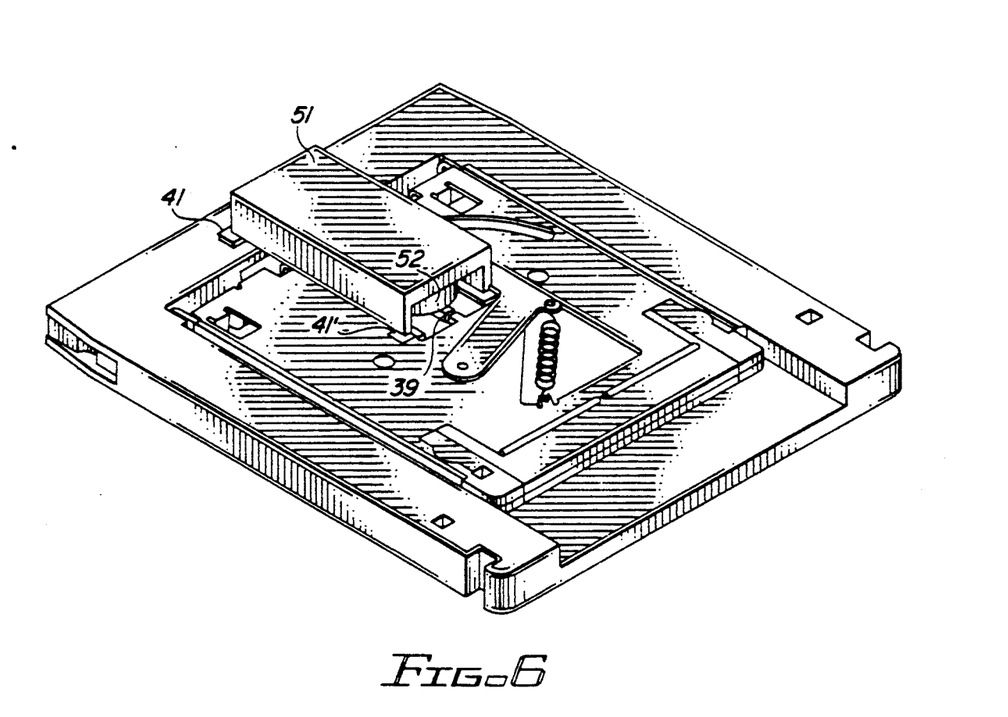
FIG. 6 shows the cartridge adaptor of FIG. 3 with a bias coil assembly lowered into the position it would take within an optical disk drive mechanism.

FIG. 6 is a view similar to FIG. 4 except that a bias coil assembly 51 is shown in position on locating pads 40, 41 and 41'. In that manner, a bias coil 52 is positioned directly over the rotating permanent magnet 39. The bias coil assembly 51 is a part of the recording/playback apparatus and is moved into position on the locating pads 40, 41 and 41' by mechanisms within that apparatus.

Figure 7:
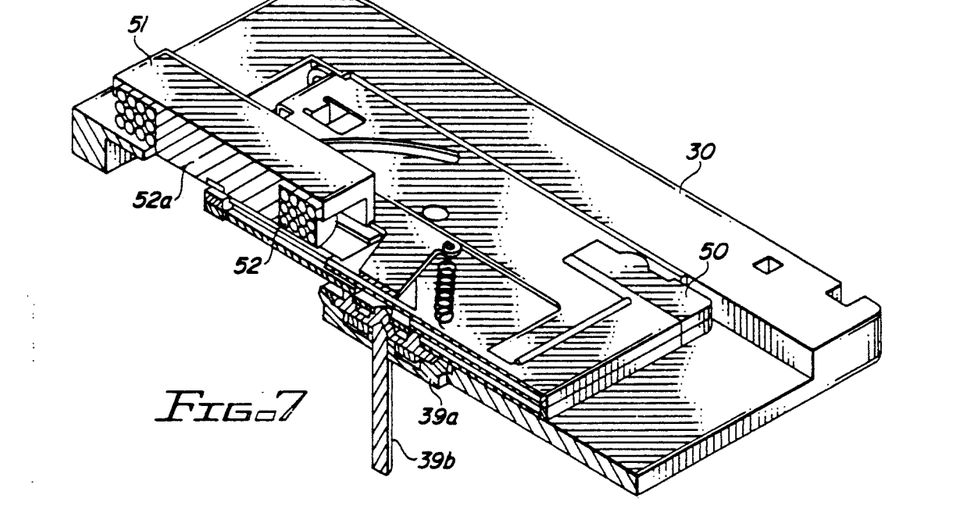
FIG. 7 shows a cut-away view of the cartridge adaptor, a 90 mm cartridge, and the spindle mechanisms of a 130 mm drive.

FIG. 7 is a cut-away view of the cartridge adaptor 30 containing a 90 mm cartridge 50 loaded into a recording/playback apparatus. Within that apparatus, a bias coil assembly 51 is shown together with the spindle 39b and the spindle hub 39c. The bias coil 52 is shown wound around armature 38a.

Figure 8:
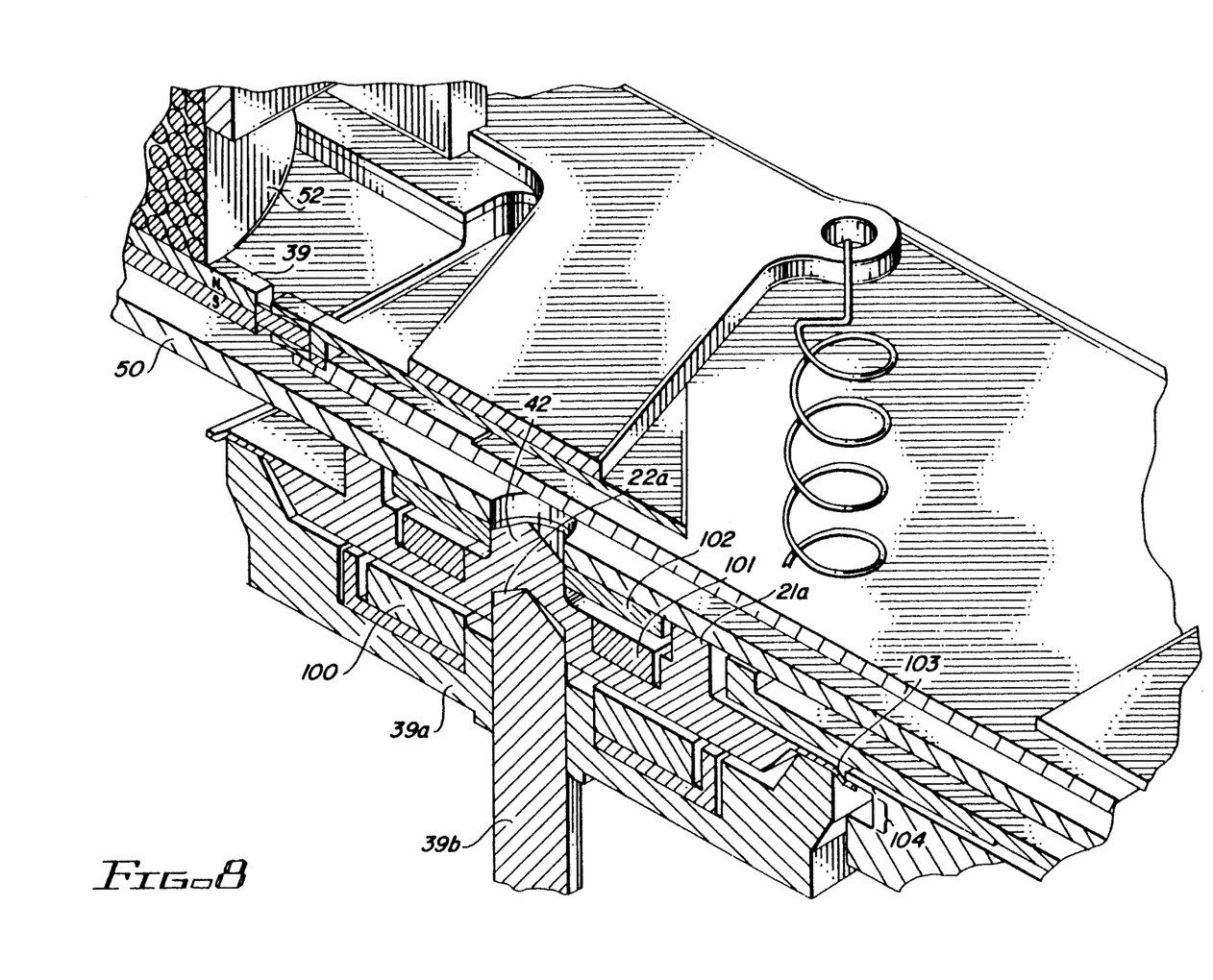
FIG. 8 is a magnified view of the spindle area shown in FIG. 7.

FIG. 8 is a cut-away sectional view similar to FIG. 7, providing a magnified view of the spindle area. Spindle 39b extends through the spindle hub 39c into an aperture 22a in adaptor hub 21a. The aperture 22a simulates the center opening 22 shown in the 130 mm cartridge in FIG. 1. An annular magnet 100 is shown held within the spindle hub 39c. The normal function of magnet 100 is to attract magnetizable material located in the hub 21 of a 130 mm cartridge thereby positioning the cartridge on the spindle and holding the 130 mm media to the spindle hub so that the media rotates with the spindle and hub. In FIG. 8, however, the function of magnet 100 is to hold the adaptor hub 21a in place for rotation with hub 39c. Annular magnet 101 is shown located in adaptor hub 21a functions to hold magnetizable material 102 in the 90 mm media 50 in place for rotation with the adaptor hub 21a. In that manner, the media is magnetically connected to the adaptor hub, which in turn is magnetically connected to the spindle hub for rotation with the spindle. The adaptor hub 21a is positioned on the spindle through the action of the aperture 22a and also through a downwardly extending lip 103 which locates the adaptor hub 21a at the outer periphery of the spindle hub 39c. Lip 103 also extends into a capture groove 104 which groove is a part of the adaptor cartridge body 30. The lip 103 and capture groove 104 act to hold the adaptor hub 21a in place within the cartridge adaptor when the cartridge adaptor is removed from the drive and is not loaded with a 90 mm cartridge.

In operation, the adaptor tray 33 is pivoted to a raised position, as shown in FIG. 3, for reception of a 90 mm cartridge. The 90 mm cartridge is inserted into the tray 33 after which the tray is pivoted to a closed position placing the centering hole of the 90 mm media on the pseudo-spindle 42 of the adaptor hub 21a. The adaptor hub contains a magnet 101 which holds the 90 mm disk in position firmly attached to the adaptor hub. When the cartridge is inserted into the adaptor tray, a shutter arm 36 acts to open the shutter 19a of the cartridge to expose the 90 mm media through openings 38 and 38a. The cartridge adaptor is then inserted into a tray 70 of recording/playback apparatus, and through the action of that apparatus is brought into contact with the drive spindle 39b which is inserted into a centering aperture 22a in the adaptor hub. As mentioned above, the adaptor hub 21a is held in position on the spindle hub 39c through the magnetic action of a magnet 100 located within the spindle hub 39c. The adaptor hub also contains a magnet 101 which in turn holds the 90 mm media in place. In that manner, the 90 mm media is caused to rotate in conjunction with the spindle 39b.

Figure 9A:
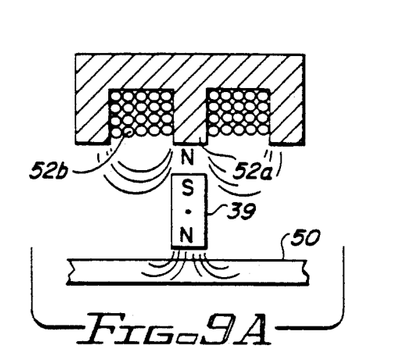
Figure 9B:
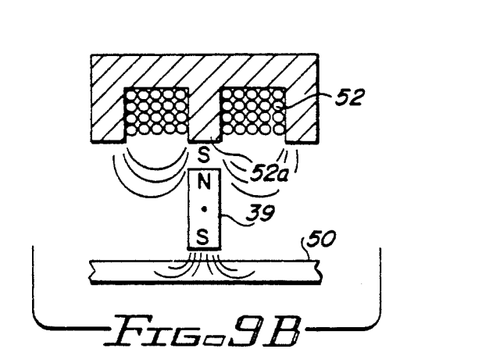
Figure 9C:
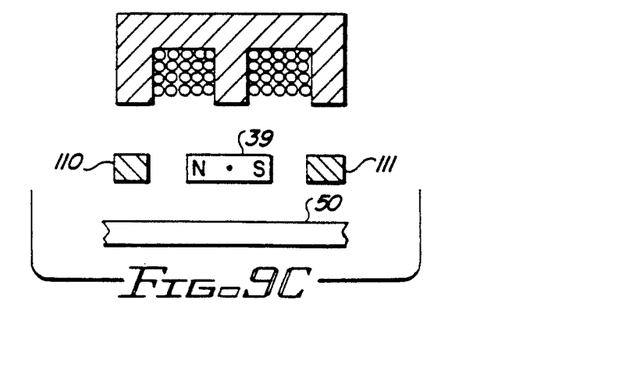

FIG. 9 comprised of FIGS. 9a, 9b, and 9c, diagrammatically illustrates the action of the bias coil 52 and the rotating magnet 39 held within the adaptor cartridge 30. In FIG. 9a, bias coil 52b is energized with d-c current to provide a north pole at armature 52a causing the rotating permanent magnet 39 to align itself relative to the bias coil 52b and the 90 mm optical disk 50 to provide a magnetic field on disk 50. In that manner, when a laser beam strikes the optical disk 50 and heats the disk to a sufficient degree, magnetic domains within the disk 50 are oriented by the field provided through the rotating magnet 39.

FIG. 9b is similar to FIG. 9a except that the bias coil 52b is energized with d-c current in the opposite direction, causing a south pole to be established in the armature 52a thereby rotating the permanent magnet 39 such that a reverse magnetic field operates on the media 50. In that manner, when the media 50 is heated by a laser beam, the heated magnetic domains are caused to take a reverse magnetic orientation from those not heated.

FIG. 9c shows optional elements which may be added to the adaptor cartridge for that case in which it is not desired to provide a magnetic field to the 90 mm disk 50. Pole pieces 110 and 111 are added to position the rotating magnet 39 such that it does not bias the disk 50.

While the invention has been described above with respect to specific embodiments, it will be understood by those skilled in the art that various changes in form and details may be made therein without departing from the spirit and scope of the invention which receives definition in the following claims.

I claim:

1. A cartridge adaptor for holding a first cartridge containing a disk medium of a small diameter so that said first cartridge can be inserted and used in a disk drive apparatus designed for a second cartridge containing a disk medium of a relatively large diameter, comprising:
   an adaptor cartridge body with external dimensions which duplicate the dimensions for said second cartridge (130 mm, for example);
   a hollowed out area within said body for containing said first cartridge (for example, 90 mm) when said first cartridge is loaded into said cartridge adaptor;
   an adaptor hub located within said body, a first surface of said adaptor hub for simulating a spindle hub for a drive designed for said first cartridge whereby said adaptor hub functions to locate the small diameter medium contained within said first cartridge onto the simulated spindle; a second surface of said adaptor hub for simulating a cartridge hub for said second cartridge whereby said adaptor hub functions to mate with a relatively large spindle hub in a drive for said second cartridge.

2. The cartridge adaptor of claim 1 further including magnetic means located within said adaptor hub for holding said hub in proper location on said large spindle hub when said cartridge adaptor is inserted into said disk drive for said second cartridge; and further, for attracting and holding magnetizable material within said disk medium of a small diameter when said first cartridge is positioned within said cartridge adaptor.

3. The cartridge adaptor of claim 2 further including a spindle adaptor means located in the center of said adaptor hub for receiving the top of the drive spindle of said large spindle hub and for simulating the top of a spindle of a drive for said first cartridge, spindle adaptor means for insertion into the center hole of said disk medium of a small diameter when said first cartridge is positioned within said cartridge adaptor.

4. The cartridge adaptor of claim 3 further including capture means located within said adaptor hub for holding said adaptor hub within said cartridge adaptor.

5. The cartridge adaptor of claim 4 wherein said capture means includes a lip at the periphery of the adaptor hub for interaction with a capture groove located within the said body.

6. The cartridge adaptor of claim 3 further including an adaptor tray located within said hollowed out area within said body, said adaptor tray for holding said first cartridge upon insertion, said adaptor tray pivoting in said body for raising said tray out of said hollowed out area for ease of insertion and removal of said first cartridge and for properly positioning said first cartridge when said adaptor tray is lowered into said hollowed out area by placing a center hole of said disk of a small diameter onto said spindle adaptor means.

7. The cartridge adaptor of claim 6 further including capture means located within said adaptor hub for holding said adaptor hub within said cartridge adaptor.

8. The cartridge adaptor of claim 7 wherein said capture means includes a lip at the periphery of the adaptor hub for interaction with a capture groove located within said body.

9. The cartridge adaptor of claim 3 further including permanent magnet means located within said body directly adjacent an erasable optical recording surface of said disk medium of a small diameter when said first cartridge is positioned within said cartridge adaptor, said permanent magnet means mounted for rotation so that it can act to supply a magnetic field of a first polarity to said disk medium of a small diameter when positioned in a first orientation and to supply a magnetic field of a second polarity when positioned in a second orientation.

10. The cartridge adaptor of claim 9 wherein said permanent magnet means is mounted for rotation to said first orientation or to said second orientation through a magnetic action of field producing means located within said disk drive for said second cartridge.

11. The cartridge adaptor of claim 10 further including an adaptor tray located within said hollowed out area within said body, said adaptor tray for holding said first cartridge upon insertion, said adaptor tray pivoting in said body for raising said tray out of said hollowed out area for ease of insertion and removal of said first cartridge and for properly positioning said first cartridge when said adaptor tray is lowered into said hollowed out area by placing a center hole of said disk of a small diameter onto said spindle adaptor means.

12. The cartridge adaptor of claim 11 further including capture means located within said adaptor hub for holding said adaptor hub within said cartridge adaptor.

13. The cartridge adaptor of claim 12 wherein said capture means includes a lip at the periphery of the adaptor hub for interaction with a capture groove located within said body.

14. The cartridge adaptor of claim 2 further including permanent magnet means located within said body directly adjacent an erasable optical recording surface of said disk medium of a small diameter when said first cartridge is positioned within said cartridge adaptor, said permanent magnet means mounted for rotation so that it can act to supply a magnetic field of a first polarity to said disk medium of a small diameter when positioned in a first orientation and to supply a magnetic field of a second polarity when positioned in a second orientation.

15. The cartridge adaptor of claim 14 wherein said permanent magnet means is mounted for rotation to said first orientation or to said second orientation through a magnetic action of field producing means located within said disk drive for said second cartridge.

16. The cartridge adaptor of claim 1 further including permanent magnet means located within said body directly adjacent an erasable optical recording surface of said disk medium of a small diameter when said first cartridge is positioned within said cartridge adaptor, said permanent magnet means mounted for rotation so that it can act to supply a magnetic field of a first polarity to said disk medium of a small diameter when positioned in a first orientation and to supply a magnetic field of a second polarity when positioned in a second orientation.

17. The cartridge adaptor of claim 16 wherein said permanent magnet means is mounted for rotation to said first orientation or to said second orientation through a magnetic action of field producing means located within said disk drive for said second cartridge.

18. A cartridge adaptor for holding a first cartridge containing an erasable optical recording disk medium of a small diameter so that said first cartridge can be inserted and used in a disk drive apparatus designed for a second cartridge containing disk medium of a relatively large diameter, comprising:
  an adaptor cartridge body with external dimensions which duplicate the dimensions for said second cartridge (for example, 130 mm);
  a hollowed out area within said body for containing said first cartridge (for example 90 mm) when said first cartridge is loaded into said cartridge adaptor; and
  permanent magnet means located within said body directly adjacent to an erasable optical recording surface of said disk medium of a small diameter when said first cartridge is positioned within said cartridge adaptor, said permanent magnet means mounted for rotation so that it can act to supply a magnetic field of a first polarity to said disk medium of a small diameter when positioned in a first orientation and to supply a magnetic field of a second polarity when positioned in a second orientation.

19. The cartridge adaptor of claim 18 wherein said permanent magnet means is mounted for rotation to said first orientation or to said second orientation through a magnetic action of field producing means located within said disk drive for said second cartridge.

* * * * *